United States Patent [19]

Kumura et al.

[11] Patent Number: 4,862,771
[45] Date of Patent: Sep. 5, 1989

[54] CONTROL FOR CONTINUOUSLY VARIABLE TRANSMISSION FOR QUICK DOWNSHIFTING TO ESTABLISH ENGINE BRAKE RUNNING

[76] Inventors: Haruyoshi Kumura, 1718-39 Koshiga, Kamakura City; Yutaka Suzuki, 322-8, Ojiri, Hatano City, both of Japan

[21] Appl. No.: 94,991

[22] Filed: Sep. 10, 1987

[30] Foreign Application Priority Data

Sep. 10, 1986 [JP] Japan .................... 61-211416

[51] Int. Cl.⁴ ............................................. B60K 41/12
[52] U.S. Cl. ........................................ 74/866; 74/867
[58] Field of Search ................ 74/866, 867; 474/12, 474/18, 28

[56] References Cited

U.S. PATENT DOCUMENTS

| | | | |
|---|---|---|---|
| 4,519,790 | 5/1985 | Yamamuro et al. | 474/28 X |
| 4,526,557 | 7/1985 | Tanaka et al. | 474/18 |
| 4,533,340 | 8/1985 | Abo et al. | 474/28 |
| 4,536,171 | 8/1985 | Tanaka et al. | 474/28 |
| 4,543,077 | 9/1985 | Yamamuro et al. | 474/28 X |
| 4,589,071 | 5/1986 | Tananyri et al. | 364/424 |
| 4,597,308 | 7/1986 | Tanaka et al. | 74/866 |
| 4,603,602 | 5/1986 | Tanaka et al. | 74/866 |
| 4,651,595 | 3/1987 | Miyawaki | 74/866 |
| 4,721,019 | 1/1988 | Nakamura et al. | 74/866 |
| 4,736,655 | 4/1988 | Kumura et al. | 74/866 |

FOREIGN PATENT DOCUMENTS

61-105351 5/1986 Japan .

Primary Examiner—Dwight G. Diehl

[57] ABSTRACT

A control for a continuously variable transmission for quick downshifting to establish an effective engine brake running of an automotive vehicle, comprises a shift actuator, a shift operating mechanism for effecting a shifting in reduction ratio of the continuously variable transmission in response to a change in operating position of the shift actuator, and a control unit for varying a speed at which the shift actuator changes its operating position when a manually operable valve is placed at a L range position and an engine throttle valve is fully closed. More specifically, the shift actuator changes its operating position at a higher speed for quick downshifting to a reduction ratio suitable for an effective engine brake running.

8 Claims, 7 Drawing Sheets

4,862,771

CONTROL FOR CONTINUOUSLY VARIABLE TRANSMISSION FOR QUICK DOWNSHIFTING TO ESTABLISH ENGINE BRAKE RUNNING

RELATED APPLICATIONS

U.S. patent application Ser. No. 792,422, now abandoned, filed Oct. 29, and assigned to the same assignee which the present application is to be assigned to: This U.S. patent application claims the priority on Japanese patent application No. 59-226706 which was filed on Oct. 30, 1984 and laid open under publication JP-A 61-105351 on May 23, 1986. This U.S. patent application has a corresponding European patent application No. 85113788.5 which was filed on Oct. 29, 1985 and laid open under publication No. 0180209 on May 7, 1986.

U.S. patent application Ser. No. 922,400, filed Oct. 23, 1986, now U.S. Pat. No. 4,735,113, which is a C-I-P application of the above-mentioned U.S. patent application Ser. No. 792,422, now abandoned.

BACKGROUND OF THE INVENTION

The present invention relates to a control for a continuously variable transmission for an automotive vehicle for quick downshifting to establish an engine brake running.

U.S. patent application Ser. No. 922,400 discloses a continuously variable transmission which has a shift control valve with a spool mechanically connected via a shift operating mechanism to a shift actuator in the form of a stepper motor. The stepper motor is supplied with a stepper motor drive signal by a control unit and rotatable to assume an operating position instructed by the control unit. Assuming now that an automotive vehicle is travelling with a small reduction ratio established in the continuously variable transmission, when the control unit determines a downshifting toward a relatively large reduction ratio, the stepper motor is caused to rotate at a predetermined speed in a downshift direction. This causes the shift operating mechanism to initially cause the shift control valve to increase an effective drain area through which the hydraulic fluid passes toward a drain port. As a result, a pressure in the hydraulic fluid applied to the driver pulley drops to allow the V-belt to move one of the driver pulley discs away from the other. This movement of the driver pulley disc causes the shift control valve to decrease the effective drain area. When the spreading force applied by the V-belt to the driver pulley discs establishes a new equilibrium state with a force generated by the hydraulic fluid pressure applied to the driver pulley, a new reduction ratio is established. With the same drain effective area, a time required for the continuously variable transmission downshifts to a new relatively large reduction ratio differs depending on whether a positive torque is applied to the driver pulley or a negative torque is applied to the driver pulley. The negative torque is applied to the driver pulley when a driver shifts a manual valve from a D (drive) range position to a L (low) range position demanding an engine brake running. With the negative torque applied, since the wedging force applied to the driver pulley discs by the V-belt is weak, the spreading movement of the driver pulley discs is slow accordingly. This causes a slow downshifting under this condition as compared to a downshifting effected with the positive torque applied to the driver pulley during a kick-down operation.

Thus, the automotive vehicle with this automatic transmission is slow in establishing engine brake running after the driver has moved the manual valve from the D range to L range, failing to provide an effective engine brake feeling possessed by the driver. In order to speed up this downshifting, one conceivable measure is to shorten a time required for the stepper motor to assume a desired or target operating position instructed by the control unit by increasing the speed at which the stepper motor rotates. However, if the speed at which the stepper motor is increased sufficiently to speed up the downshift for establishing an engine brake running, the V-belt slips relative to the driver pulley during downshifting for a kick-down operation. Thus, there is the limit to increasing the speed at which the stepper motor rotates. In the case of the above-mentioned known continuously variable transmission, the speed at which the stepper motor rotates is constant.

An object of the present invention is to provide a control for a continuously variable transmission for quick downshifting to establish an engine brake running of an automotive vehicle.

More particularly, an object of the present invention is to provide a ratio control for a continuously variable transmission whereby quick downshifting is effected without causing a slip of a V-belt relative to a driver pulley during downshifting for a kick-down operation.

SUMMARY OF THE INVENTION

According to the present invention, there is provided a control for a continuously variable transmission for an automotive vehicle having an engine drivingly connected to the continuously variable transmission. The continuously variable transmission includes a manually operable member movable among a plurality of range positions including a predetermined drive range position provided for effective engine brake running of the automotive vehicle. The control comprises:

a shift actuator;

means for effecting a shifting in reduction ratio of the continuously variable transmission in response to a change in operating position of said shift actuator;

means for detecting which of the range positions the manually operable member is placed at and generating an output signal indicative of the range position detected;

means for detecting a throttle opening degree of the engine throttle valve and generating an output signal indicative of the throttle opening degree detected; and means responsive to said output signals for varying a speed at which said shift actuator changes its operating position.

More specifically, according to the present invention, there is provided a control wherein a speed at which said shift actuator changes its operating position is increased when the manually operable member is placed at the predetermined drive range position and the engine throttle valve is fully closed.

DESCRIPTION OF THE EMBODIMENT

Figure 2:
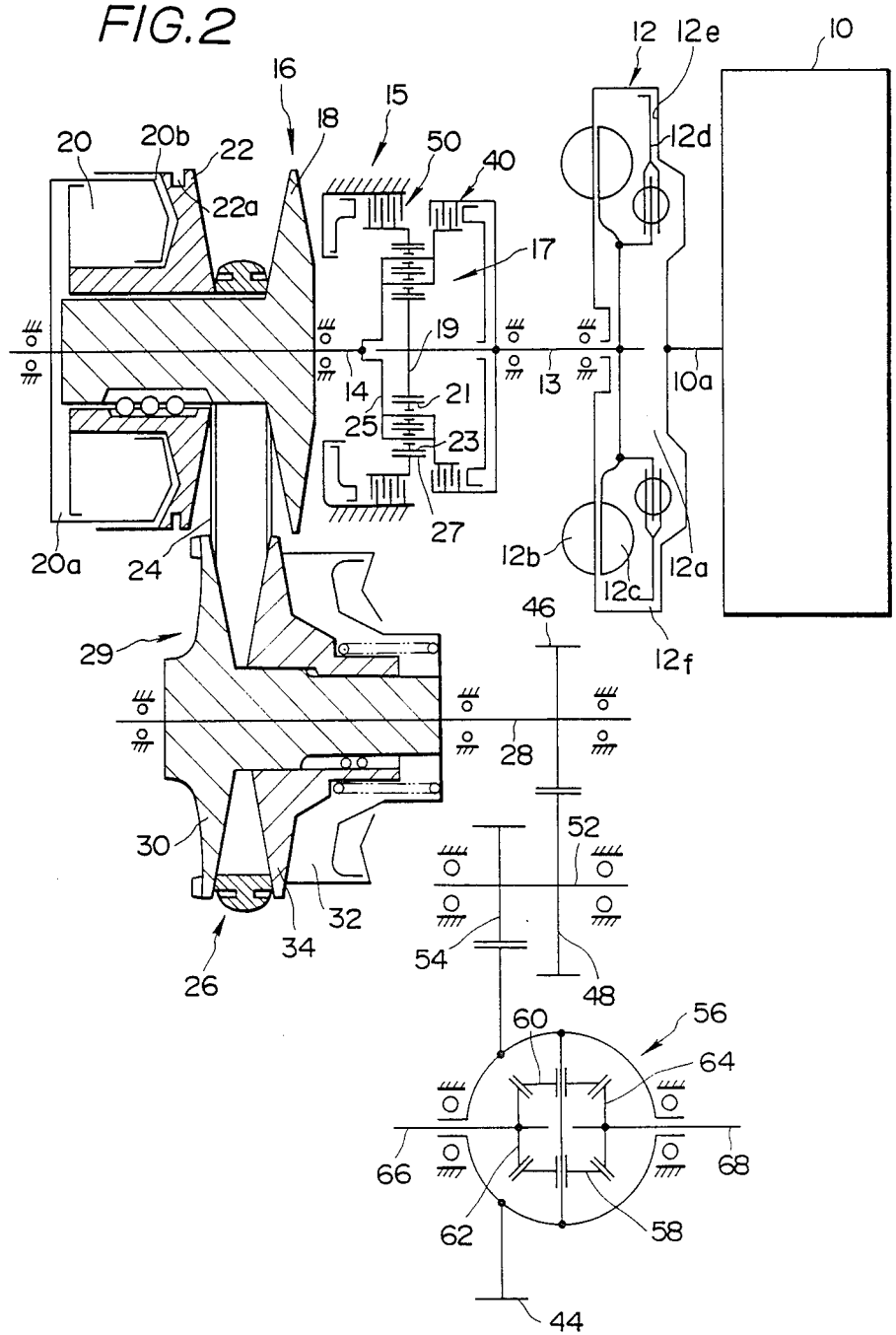
FIG. 2 is a schematic diagram showing a continuously variable transmission.

Referring to FIG. 2, an engine 10 of an automotive vehicle is shown. The engine 10 has an output shaft 10a coupled with a fluid coupling 12 including a pump impeller 12b and a turbine runner 12c, and a lock-up mechanism. The lock-up mechanism includes a friction clutch element 12d rotatable with the turbine runner 12c. The clutch element 12d divides the inside of the fluid coupling 12 into two chambers and defines a lock-up chamber 12a. When it is in the illustrated position in FIG. 2, clutch element 12d is disengaged from the adjacent end wall 12e rotatable with pump impeller 12b. This illustrated position is established when hydraulic fluid is supplied to the lock-up chamber 12a. The hydraulic fluid is then allowed to pass through a clearance 12f formed around the outer periphery of the clutch element 12d to flow into the inside of the fluid coupling 12. When the hydraulic fluid is discharged from the lock-up chamber 12a and the hydraulic fluid is supplied directly into the inside of the fluid coupling 12, there occurs a pressure difference across the clutch element 12d urging same into firm engagement with the adjacent wall 12e. The turbine runner 12c of the fluid coupling 12 is coupled with a rotary shaft 13. The rotary shaft 13 is coupled with a forward/reverse drive change-over mechanism 15. The forward/reverse drive change-over mechanism 15 has a planetary gearing 17, a forward clutch 40, and a reverse brake 50. The planetary gearing 17 comprises a sun gear 19, a pinion carrier 25 having two pinions 21, 23, and a ring gear 27. The two pinions 21, 23 are intermeshed, the pinion 21 meshes with the sun gear 19, and the pinion 23 meshes with the ring gear 27. The sun gear 19 is connected to the rotary shaft 13 for unitary rotation therewith. The pinion carrier 25 is selectively connected to the rotary shaft 13 via the forward clutch 40. The ring gear 27 is selectively held stationary via the reverse brake 50. The pinion carrier 25 is connected to a driver shaft 14 arranged coaxially with the rotary shaft 13. Mounted on the driver shaft 14 is a driver pulley 16. The driver pulley 16 comprises an axially stationary conical disk 18, and an axially movable conical disk 22 that is arranged in opposed relationship with axially stationary conical disk 18 so as to define a V-shaped pulley groove therebetween and displaceable in axial direction of driver shaft 14 under bias of hydraulic fluid pressure applied to a driver pulley cylinder chamber 20 (servo chamber). The driver pulley cylinder chamber 20 comprises two chambers 20a and 20b, and has a pressure acting area twice as large as a pressure acting area of a later described follower pulley cylinder chamber 32 (servo chamber). The driver pulley 16 is drivingly connected to a follower pulley 26 via a V-belt 24. The follower pulley 26 is mounted on a follower shaft 28. The follower pulley 26 comprises an axially stationary conical disk 30 rotatable with the follower shaft 28, and an axially movable conical disk 34 that is arranged in opposed relationship with the axially stationary conical disk 30 so as to define a V-shaped pulley groove and displaceable in axial direction of the follower shaft 28 under the bias of a hydraulic fluid pressure applied to the follower pulley cylinder chamber 32. The driver pulley 16, V-belt 24, and follower pulley 26 cooperate with each other to constitute a continuously variable V-belt transmission mechanism 29. Fixedly connected to the follower shaft 28 is a driver gear 46 which is in mesh with an idler gear 48 rotatable with an idler shaft 52. The idler shaft 52 has a pinion 54 rotatable therewith, the pinion 54 being in mesh with a final gear 44. A pair of pinions 58 and 60 that form a part of a differential 56 are fixedly connected to the final gear 44 for rotation therewith. The pinions 58, 60 are in mesh with a pair of side gears 62, 64, respectively, which are fixedly coupled with a pair of axles 66, 68, respectively. The axles 66, 68 are connected to road wheels of an automotive vehicle, respectively.

An engine torque on the engine output shaft 10a is transferred via the fluid coupling 12 and the rotary shaft 13 to the forward/reverse drive change-over mechanism 15 where the direction of the torque is switched, if necessary. With the forward clutch 40 engaged and the reverse brake 50 released, the torque of the rotary shaft 13 is transferred via the planetary gearing 17 to drive same in the forward direction. With the forward clutch 40 released and the reverse brake 50 engaged, the planetary gearing 17 acts to change the direction of the torque and transfers the torque of the rotary shaft 13 to the driver shaft 14 to drive same in the reverse direction. The torque transferred to the driver shaft 14 is transferred via driver pulley 16, V-belt 24, follower pulley 26, follower shaft 28, driver gear 46, idler gear 48, idler shaft 52, pinion gear 54, and final gear 44, differential 56 to the axles 66, 68. When both the forward clutch 40 and the reverse brake 50 are released, the transmission of torque in interrupted. A ratio of rotation between the driver pulley 16 and the follower pulley 26 is variable by altering the running diameter of the V-belt 24 on the driver pulley 16 and that of the V-belt 24 on the follower pulley 26.

Figure 1A:
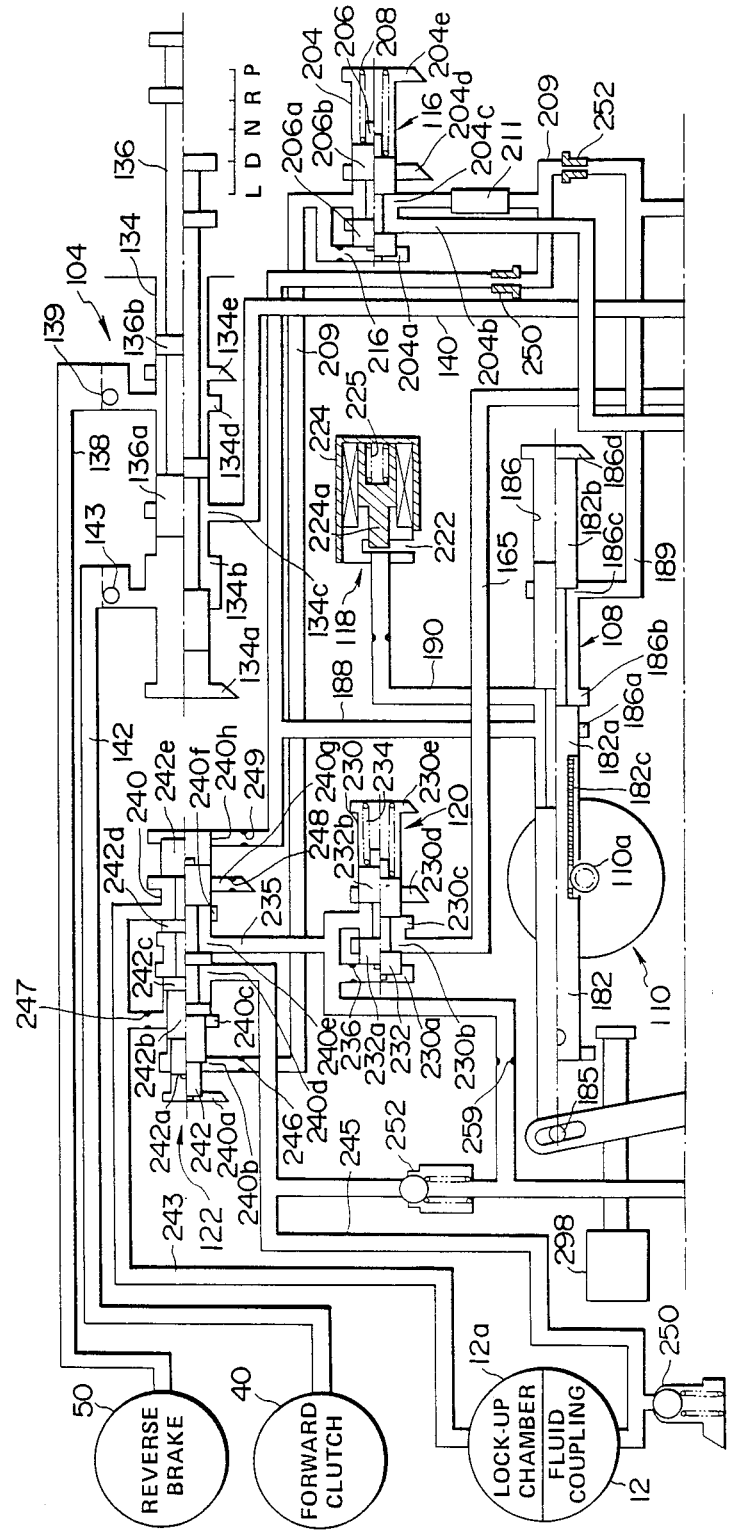
FIGS. 1A and 1B, when combined, are a hydraulic control system for a continuously variable transmission shown in FIG. 2.
Figure 1B:
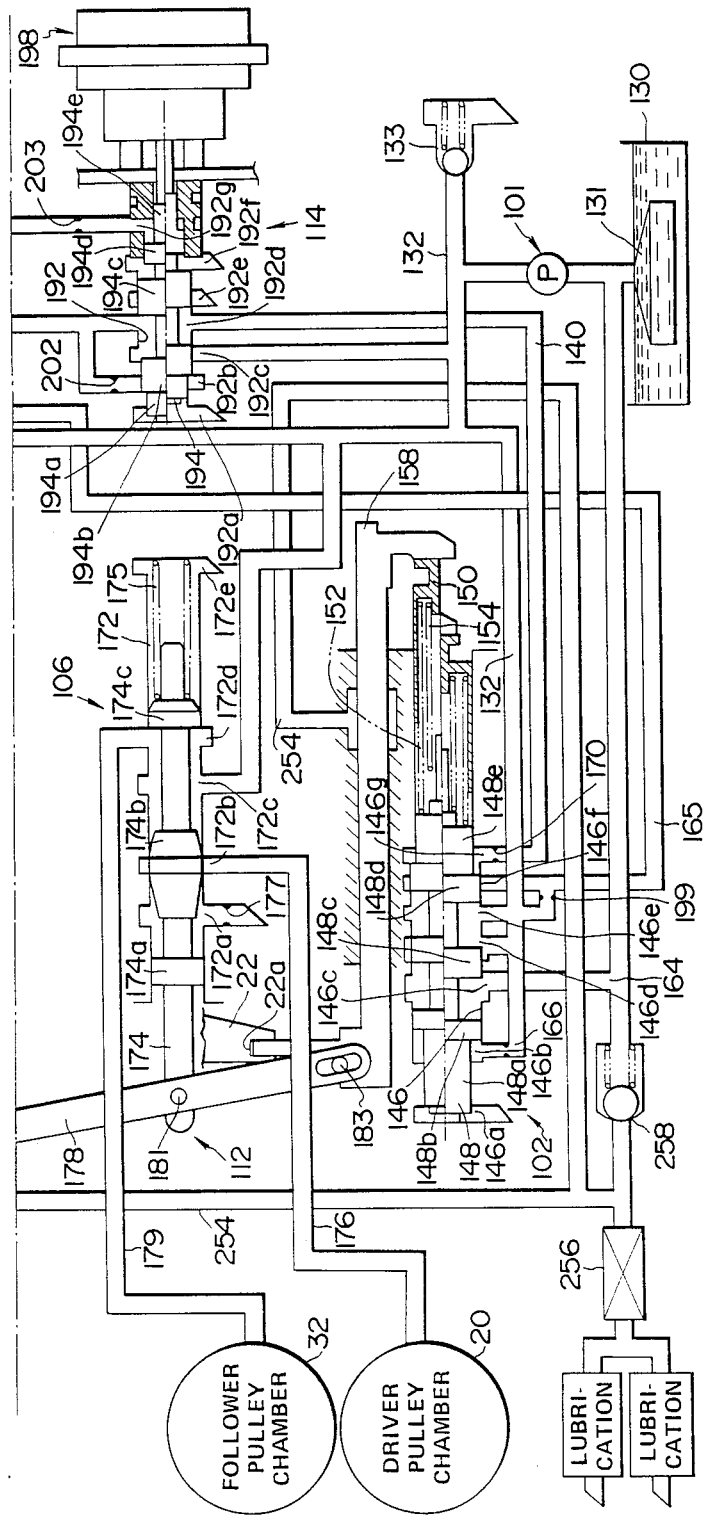

Hereinafter, a hydraulic pressure control system for the above mentioned continuously variable transmission is described. As shown in FIGS. 1A and 1B, it comprises a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, a solenoid operated valve 118, a coupling pressure regulator valve 120, and a lock-up control valve 122.

The hydraulic fluid pump 101 draws in hydraulic fluid (oil) from a tank 130 via a strainer 131, and discharge it into a hydraulic fluid line 132. Hydraulic fluid line 132 conducts the discharged fluid to ports 146b, 146d and 146e of the line pressure regulator valve 102 where pressure regulation is effected to generate a line pressure. The hydraulic fluid line 132 is allowed to communicate with a port 192c of the throttle valve 114 and a port 172c of the shift control valve 106. The fluid line 132 communicates also with a port 204b of the constant pressure regulator valve 116. Provided in the fluid line 132 is a line pressure relief valve 133 that prevents abnormal increase in the line pressure.

The manual valve 104 has a valve bore 134, formed within a valve body, that is provided with five ports 134a, 134b, 134c, 134d, and 134e, and a spool 136 having two lands 136a and 136b which cooperate with the valve bore 134. The spool 136 which is urged to move by a selector lever (not shown), has five detent positions, namely P, R, N, D, and L range positions. The ports 134a and 134e are drain ports, and the port 134b communicates with the forward clutch 40 via the hydraulic fluid line 142. The hydraulic fluid line 142 is provided with a one-way orifice 143 that provides a throttling effect only when hydraulic fluid is supplied to the forward clutch 40. The port 134c communicates via a hydraulic fluid line 140 with ports 192b and 192d of the throttle valve 114, and the port 134d communicates via a hydraulic fluid line 138 with the reverse brake 50. The hydraulic fluid line 138 is provided with a one-way orifice 139 that provides a throttling effect only when the hydraulic fluid is supplied to the reverse brake 50. When the spool 136 assumes the P range position, the land 136a closes the port 134c that is supplied with the throttle pressure via the hydraulic fluid line 140 from the throttle valve 114 (clutch pressure regulator valve), the forward clutch 40 is drained via a hydraulic fluid line 142 and the drain port 134a, and the reverse brake 50 is drained via a hydraulic fluid line 138 and the drain port 134e. When the spool 136 assumes the R range position, the ports 134c and 134d are allowed to communicate with each other via a space within the valve bore 134 defined between the lands 136a and 136b, and thus the reverse brake 50 is supplied with the throttle pressure, whereas the forward clutch 40 is drained via the port 134a. When the spool 136 assumes the N position, the port 134c is positioned between the lands 136a and 136b, and thus it is prevented from communicating with the other ports, whereas the ports 134b and 134d are drained, so that the reverse brake 50 and the forward clutch 40 are both drained. When the spool 136 assumes the D or L range position, the ports 134b and 134c are allowed to communicate with each other via the space within the valve bore 134 defined between the lands 136a and 136b, allowing supply of the throttle pressure to the forward clutch 40, whereas the reverse brake 50 is drained via port 134e.

The line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between the spool 148 and the sleeve 150. The sleeve 150 in abutting engagement with a bias member 158 is urged to move to the left as viewed in FIGS. 1A and 1B in response to the leftward movement of the bias member 158. The bias member 158 is mounted within the valve body in parallel to the axis of the valve bore 146, and it is formed, at the opposite end portion, with an integral arm meshing with a circumferential groove 22a with which the axially movable conical disk 22 of the driver pulley 16 is formed. Arrangement is such that an increase in reduction ratio causes movement of the sleeve 150 to the left as viewed in FIGS. 1A and 1B, whereas a decrease in reduction ratio causes movement of the sleeve 150 to the right as viewed in FIGS. 1A and 1B. Among two springs 152 and 154, the spring 152 arranged outside has opposite ends thereof always engaged by the sleeve 150 and the spool 148 and thus is always in its compressed state, whereas the spring 154 inside is not compressed until the sleeve 150 is moved to the left from a position indicated by the upper half thereof by a predetermined distance. The port 146a of the line pressure regulator valve 102 is a drain port. The port 146g is supplied with the throttle pressure from the hydraulic fluid line 140 that serves as a throttle pressure circuit. The port 146c communicates with the hydraulic fluid line 164 that serves as a drain circuit. The ports 146b, 146d, and 146e communicate with the hydraulic fluid line 132 that serves as a line pressure circuit. The port 146f communicates via a hydraulic fluid line 165 with a port 230b of the coupling pressure regulator valve 120. The hydraulic fluid line 165 communicates with the fluid line 132 via an orifice 199. Inlets to the ports 146b and 146g are provided with orifices 166 and 170, respectively. As will now be understood, the spool 148 of line pressure regulator valve 102 is subject to two forces directed to the left as viewed in FIGS. 1A and 1B, one due to the spring 152 alone (or both of the springs 152 and 154) and the other resulting from the hydraulic fluid pressure (throttle pressure) supplied to the port 146g to act on a differential area between the lands 148d and 148e, and it is also subject to a force directed to the right as viewed in FIGS. 1A and 1B resulting from the hydraulic fluid pressure (line pressure) supplied to the port 146b to act on a differential area between the lands 148a and 148b. Thus, the spool 148 effects pressure regulation to generate the line pressure by adjusting the amount of flow of hydraulic fluid from the port 146d toward the port 146c until equilibrium state is established wherein the above mentioned forces directed to the left and to the right balance with each other. The characteristic of the line pressure is such that it increases as the reduction ratio becomes large, and it increases also in response to an increase in throttle pressure supplied to the port 146g. The above-mentioned characteristic of the line pressure meets the demand that a force with which the pulley discs grip the V-belt be increased as the reduction ratio becomes large and the engine output torque increases.

The shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing the spool 174 to the left as viewed in FIGS. 1A and 1B. The port 172b communicates via a hydraulic fluid line 176 with the driver pulley cylinder chamber 20, and the ports 172a and 172e are drain ports. The outlet of the port 172a is provided with an orifice 177. The port 172d communicates via a hydraulic fluid line 179 with the follower pulley cylinder chamber 32. The port 172c communicates with the hydraulic fluid line 132 that serves as the line pressure circuit, and thus supplied with the line pressure. Left end of the spool 174 is rotatably mounted on a lever 178 of the shift operation mechanism 112 by a pin 181 at a generally middle portion thereof. Because the land 174b has an axial cross sectional configuration defined by a curved boundary, hydraulic fluid supplied to the port 172c at line pressure mainly flows into the port 172b, but it is partially discharged to the port 172a. As a result, hydraulic pressure developed in the port 172b is determined by a ratio of the amount of incoming flow into this port to the amount of discharging flow. Thus, the leftward movement of the spool 174 causes a decrease in clearance disposed on the discharge side and an increase in clearance disposed on the line pressure side, resulting in an increase in hydraulic pressure developed in the port 172b. Usually, the port 172d is supplied with the line pressure applied to port 172c. The hydraulic pressure at the port 172b is supplied via the hydraulic fluid line 176 to the driver pulley cylinder chamber 20, whereas the hydraulic pressure at the port 172d is supplied via the hydraulic fluid line 179 to the follower pulley cylinder chamber 32. As a result, the leftward movement of spool 174 causes an increase in the hydraulic pressure in the driver pulley cylinder chamber 20, resulting in a decrease in width of the V-shaped pulley groove of driver pulley 16. That is, this causes an increase in running diameter of the V-belt 24 on the driver pulley 16, and a decrease in running diameter of the V-belt 26 on the follower pulley 26, thus causing a decrease in reduction ratio. Rightward movement of spool 174 causes the reverse process to take place, thus causing an increase in reduction ratio.

Although, as mentioned before, the lever 178 of shift operation mechanism 112 has middle portion thereof connected to the spool 174 by the pin 181 and has one end connected to the before mentioned bias member 158 by the pin 183, the opposite end of the lever 178 is connected to a rod 182 by a pin 185. The rod 182 is formed with a rack 182c that meshes with a pinion 110a of the shift motor 110. With this shift operation mechanism 112, if the pinion 110a of the shift motor 110 that is subject to control of the control unit 300 is rotated in such a direction as to cause the rod 182 to move to the right as viewed in FIGS. 1A and 1B, this rightward movement of the rod 182 causes the lever 178 to swing about the pin 183 clockwise, thus urging the spool 174 of the shift control valve 106 for moving to the right. As described previously, this causes the axially movable conical disc 22 of the driver pulley 16 to move to the left as viewed in FIGS. 1A and 1B, thus causing an increase in width of the V-shaped pulley groove of driver pulley 16, resulting in an increase in reduction ratio. Because the one end of the lever 178 is linked to the bias member 158 by the pin 183, the above mentioned movement of the axially movable conical disk 22 causes the bias member 158 to move to the left as viewed in FIGS. 1A and 1B. This leftward movement of the bias member 158 causes the lever 178 to swing about the pin 185 disposed on the other end thereof clockwise. Thus, the spool 174 is pulled back to the left, tending to cause a decrease in reduction ratio. After repeating this process, the spool 174, the driver pulley 16, and the follower pulley 26 establish a new stable reduction ratio state corresponding to a new operating position assumed by the shift motor 110. If the shift motor 110 is rotated in the opposite direction so as to urge the rod 182 to the left, this leftward movement of the rod 182 causes the associated members to move until they assume a new stable reduction ratio state corresponding to a new rotary position of shift motor 110. The rod 182 is movable beyond the position corresponding to the maximum reduction ratio and further to the right, as viewed in FIGS. 1A and 1B, into an overstroke range. This movement of the rod 182 into the overstroke range will turn on a change-over detection switch 298. From the preceding description, it will now be understood that if the shift motor 110 is rotated in accordance with a predetermined pattern, the reduction ratio will vary accordingly, so that it is possible to control the reduction ratio of the continuously variable transmission by the shift motor 110.

The shift motor 110 (which will be hereinafter called as "stepper motor") is so controlled as to assume an operating position that is determined in correspondance with a pulse number signal determined in the control unit 300. The control unit 300 gives pulse number signal in accordance with a predetermined shift pattern.

The adjustment pressure change-over valve 108 has a valve element thereof formed integrally with the rod 182 of the shift operation mechanism 112. That is, the adjustment pressure change-over valve 108 has a valve bore 186, formed within the valve body, that is provided with ports 186a, 186b, 186c, and 186d, and lands 182a and 182b formed on the rod 182. The port 186a communicates with a hydraulic fluid line 188. The port 186b communicates with the solenoid operated valve 118 via a drain conduit 190. The port 186c communicates with a hydraulic fluid line 189. The port 186d is a drain port. Normally, the port 186a and the port 186b are allowed to communicate with each other via a space defined within the valve bore between the lands 182a and 182b, but when the rod 182 is displaced into the overstroke range beyond the maximum reduction ratio corresponding position, the port 186a is closed and the port 186b is allowed to communicate with port 186c.

The throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases the spool 194. When the engine intake manifold vacuum is lower than a predetermined value, for example, 300 mmHg, (viz., when the engine intake manifold vacuum is near the atmospheric level), the vacuum diaphragm 198 biases the spool 194 with a force that is in inverse proportion to the magnitude of the vacuum, whereas when the intake manifold vacuum is higher than the predetermined value, it applies no force to the spool 194. The port 192a is a drain port, the ports 192b and 192d communicate with the hydraulic fluid line 140 serving as the throttle pressure circuit, the port 192c communicates with the hydraulic fluid line 132 serving as the line pressure circuit, the port 192e is a drain port, and the port 192g communicates with the before mentioned hydraulic fluid line 189. The inlets to the ports 192b and 192g are provided with orifices 202 and 203, respectively. The spool 194 is subject to two forces directed to the left as viewed in FIGS. 1A and 1B, one resulting from the hydraulic fluid pressure supplied to port 192g to act on a differential area between the lands 194d and 194e and the other by the vacuum diaphragm 198, and it is also subject to a force, directed to the right as viewed in FIGS. 1A and 1B resulting from the hydraulic fluid pressure supplied to port 192b to act on a differential area between the lands 194a and 194b. The throttle valve 114 effects a pressure regulation until the above mentioned forces balance with each other by using the line pressure supplied to the port 192c as a pressure source and the port 192e as a discharge port. The characteristic of the throttle pressure developed at the ports 192b and 192d is such that it increases as the engine intake manifold vacuum decreases. The magnitude of the throttle pressure is adjustable by varying the adjustment pressure supplied to the port 192g.

The constant pressure regulator valve 116 has a valve bore 204, formed in the valve body, that is provided with ports 204a, 204b, 204c, 204d, and 204e, a spool 206 having lands 206a and 206b, and a spring 208 biasing the spool 206 to the left as viewed in FIGS. 1A and 1B. The ports 204a and 204c communicate with a hydraulic fluid line 209. The port 204b communicates with the hydraulic fluid line 132 serving as the line pressure circuit. The ports 204d and 204e are drain ports. The inlet to the port 204a is provided with an orifice 216. The constant pressure regulator valve 116 effects a pressure regulation to provide a constant hydraulic fluid pressure corresponding to the force of spring 208 in hydraulic fluid line 209. The hydraulic fluid line 209 is connected via a choke type throttle valve 250 with the hydraulic fluid line 188 and it is connected via a choke type throttle valve 252 with the hydraulic fluid line 189. The hydraulic fluid line 209 is provided with a filter 211.

The solenoid operated valve 118 is so constructed as to adjust the discharge, in amount, of hydraulic fluid from the drain conduit 190 to a drain port 222. The adjustment is made by a plunger 224a biased by a spring 225 toward a closed position where the discharge is prohibited under the control of a solenoid coil 224. Solenoid coil 224 is subject to pulse duty factor control by control unit 300. Since amount of hydraulic fluid discharged is in inverse proportion to amount of current passing through the solenoid 224, the hydraulic fluid pressure (adjustment pressure) is variable in inverse proportion to the amount of current passing through the solenoid 224.

The coupling pressure regulator valve 120 has a valve bore 230, formed in the valve body, that is provided with ports 230a, 230b, 230c, 230d and 230e, a spool 232 having lands 232a and 232b, and a spring 234 biasing the spool 232 to the left as viewed in FIGS. 1A and 1B. The ports 230a and 230c communicate with a hydraulic fluid line 235, the port 230b is supplied via the hydraulic fluid line 165 with hydraulic fluid which is discharged by the line pressure regulator valve 102, and the ports 230d and 230e are drain ports. The inlet to the port 230a is provided with an orifice 236. The coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to the hydraulic fluid line 235. This coupling pressure is used as a working pressure within the fluid coupling 12, and it is also used to actuate the lock-up mechanism.

The lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. The ports 240a and 240g are drain ports, port 240b communicates with the hydraulic fluid line 209, the ports 240c and 240f communicate via the hydraulic fluid line 243 with the lock-up chamber 12a, the port 240d is connected with the hydraulic fluid line 245 that communicates with the fluid coupling 12. The port 240e is supplied with the constant coupling pressure from the hydraulic fluid line 235. The port 240h is connected with the before mentioned hydraulic fluid line 188. The inlets to the ports 240b, 240c, 240g, and 240h are provided with orifices 246, 247, 248, and 249, respectively. This lock-up control valve 122 controls the supply of hydraulic fluid pressure to the fluid coupling 12 and that to the lock-up chamber 12a. The spool 242 shifts from one position to another position when the following three forces attain a predetermined relationship, one due to hydraulic fluid pressure (i.e., constant fluid pressure obtained after pressure regulation by constant pressure regulator valve 116) supplied to the port 240b to act on a differential area between the lands 242a and 242b, another due to hydraulic fluid pressure supplied to the port 240c to act on a differential area between the lands 242b and 242c, and the other due to hydraulic fluid pressure supplied to the port 240h to act on axial end of the land 242e. When the spool 242 assumes a lock-up position indicated by the upper half thereof, the port 240f is allowed to communicate with the port 240g via a space defined in the valve bore between the lands 242d and 242e, thus allowing the lock-up chamber 12a to be drained via the port 240g. In this lock-up position, the port 240d is allowed to communicate with the port 240e via a space defined in the valve bore between the lands 242c and 242d, thus allowing the supply of the coupling pressure generated by the coupling pressure regulator valve 120 to the inside of the fluid coupling 12 via the fluid line 245. As a result, the lock-up mechanism assumes the lock-up state. The hydraulic fluid line 245 is provided with a relief valve 250 that prevents application of abnormally high pressure to the fluid coupling 12. When, on the other hand, the spool 242 assumes a release position indicated by the lower half thereof as illustrated in FIGS. 1A and 1B, the port 240e is allowed to communicate with the port 240f via a space defined within the valve bore between the lands 242d and 242e, thus allowing the supply of the coupling pressure to the lock-up chamber 12a via the hydraulic fluid line 243. The port 240d, in this position, is sealed by the lands 242c and 242d. As a result, the lock-up mechanism assumes the release state, thus providing a state wherein the hydraulic fluid is supplied, as working fluid pressure, to the inside of the fluid coupling 12 via the lock-up chamber 12a past the clearance 12f (see FIG. 2). The hydraulic fluid pressure within the fluid coupling 12 is kept at a constant value by means of a pressure maintaining valve 252. The hydraulic fluid discharged by the pressure maintaining valve 252 is supplied via a hydraulic fluid line 254 to a cooler 256 where it is cooled before used for lubrication. The hydraulic fluid line 254 is provided with a cooler pressure maintaining valve 258. The hydraulic fluid discharged by the cooler pressure maintaining valve 258 returns via a hydraulic fluid line 164 to intake port of the hydraulic fluid pump 101. The hydraulic fluid line 254 leads to an area where the bias member 158 is slidably engaged with the valve body to lubricate there. The hydraulic fluid line 254 is connected via an orifice 259 with the hydraulic fluid line 235 to secure minimal supply of hydraulic fluid.

Hereinafter, the control unit 300 is further described.

Figure 3:
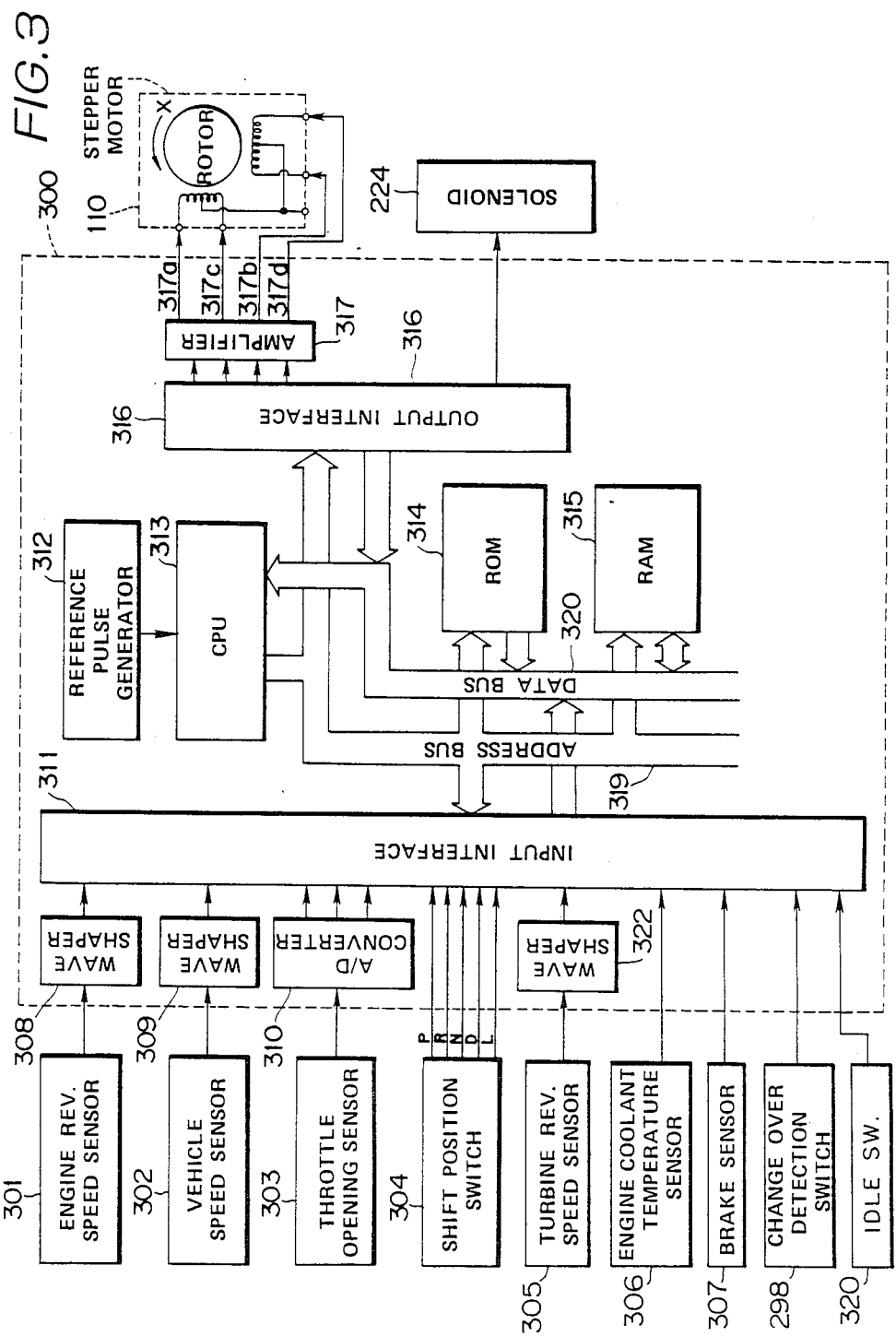
FIG. 3 is a block diagram showing a control unit for the hydraulic control system.

As shown in FIG. 3, the control unit 300 is supplied with electric signals, as input signals, from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, a brake sensor 307, and an idle switch 320. The engine revolution speed sensor 301 detects engine revolution speed by counting the number of engine ignition spark pulses, and the vehicle speed sensor 302 detects vehicle speed by measuring rotation of the output shaft of the continuously variable transmission. The throttle opening sensor 303 detects engine throttle opening degree in terms of an electric voltage. The shift position switch 304 detects which of positions P, R, N, D, and L the before mentioned manual valve 104 assumes. The turbine revolution speed sensor 305 detects the revolution speed of the turbine shaft of the fluid coupling 12. The change-over detection switch 298 is turned ON when the rod 182 of the shift operation mechanism 112 moves further beyond the maximum reduction ratio corresponding position (i.e., when the rod 182 is disposed in the overstroke range). The engine coolant temperature sensor 306 generates an output signal when engine coolant temperature is lower than a predetermined value. The brake sensor 307 detects whether vehicle brake is used. The idle switch 320 is normally OFF, but it is turned ON when the engine throttle valve is closed to an idle speed position thereof. Output signals from engine revolution speed sensor 301, vehicle speed sensor 302, and turbine revolution speed sensor 305 are supplied via associated wave shapers 308 and 309 to an input interface 311. Electric voltage signal from the throttle opening sensor 303 is converted into a digital signal at an AD converter 310 before supplied to the input interface 311. The control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. What are stored in ROM 314 include a program for control of stepper motor 110 and control of solenoid 224. RAM 317 temporarily stores information from various sensors and switch and parameters necessary for control. Output signals of the control unit 300 is supplied via output interface 316 and an amplifier 317 to the stepper motor 110 and via input interface 316 to the solenoid 224.

Hereinafter, the flowchart is explained.

Figure 4:
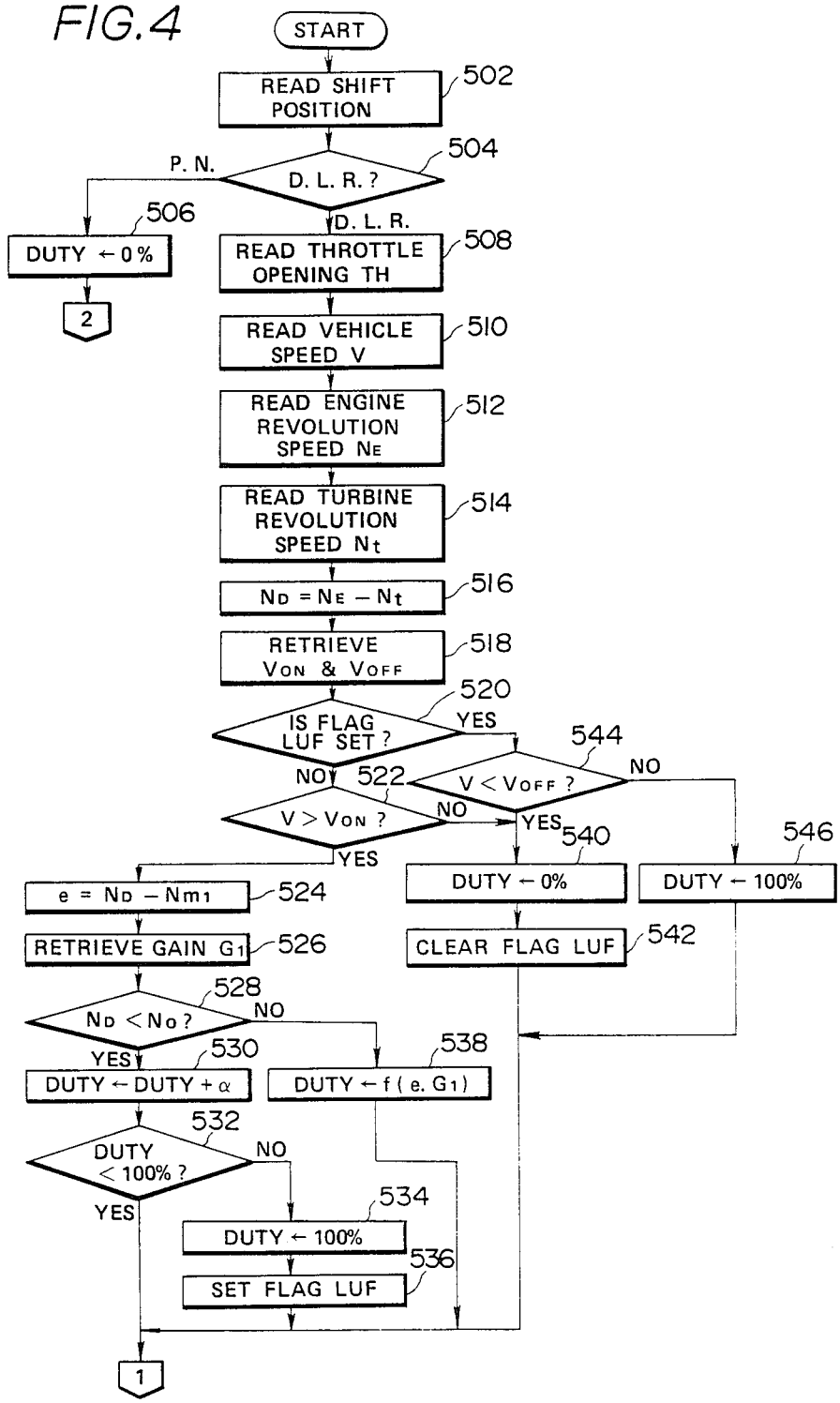
FIGS. 4 to 6 are a flowchart of a control program stored in a ROM 314 of the control unit shown in FIG. 3.

FIG. 4 shows a control routine for controlling the lock-up of the fluid coupling 12 by controlling a duty factor of electric current passing through the solenoid coil 224 of the solenoid valve 118 arranged to isolate a drain conduit 190 from a drain port 22. When the duty factor is zero, no electromagnetic force is created around the plunger 224a so that the plunger 224a assumes a closed position under the bias of the spring 225 where the drain conduit 190 is closed and isolated from the drain port 222. Assuming that the drain conduit 190 is connected to the hydraulic fluid line 188 having one end connected via the choke type orifice 250 to the constant fluid pressure prevailing line 209 and an opposite end connected to the lock-up control valve 122 so as to hydraulically bias a righthand end, as viewed in FIG. 1A, of the spool 242a. Since the drain conduit 190 is blocked and isolated from the drain port 222 when the duty factor of electric current passing through the solenoid coil 224 is set equal to 0%, the constant hydraulic fluid pressure is applied to the righthand end of the spool 242 to bias the spool 242 to a position as indicated by the bottom half thereof against hydraulic bias due to the constant fluid pressure supplied to a lefthand end of the spool 242 via the line 209 and orifice 246 by the constant pressure regulator valve 116. In this position of the spool 242, the coupling pressure from the conduit 235 is supplied via the conduit 243 to the lock-up chamber 12a. As a result, the lock-up of the fluid coupling 12 is released. When the duty factor is set equal to 100%, the electric current continuously passes through the solenoid coil 224, electromagnetically urging the plunger 224a away from the drain conduit 190 allowing communication of the drain conduit 190 with the drain port 222. This causes the hydraulic fluid to be discharged from the hydraulic fluid line 188 and a reduction in hydraulic fluid pressure within the hydraulic fluid line 188 to zero. The spool 242 of the lock-up control valve 122 moves back to a position as indicated by the upper half thereof. In this position of the spool 242 the hydraulic fluid is discharged from the lock-up chamber 12a via the line 243. As a result, the fluid coupling 12 locks up.

Referring back to FIG. 4, an output of the shift position switch 304 is read at a step 502 and a shift position selected is determined by a judgment step 504. If the shift position determined is P (parking) range or N (neutral) range, the duty factor DUTY is set equal to 0% at a step 506. The program proceeds to a step 907 (see FIG. 5) and finally to a step 638 (see FIG. 6) where the duty factor 0% is outputted as a solenoid drive signal. This causes the lock-up of the fluid coupling 12 to be released. If the shift position determined at the step 504 is D (drive) range or L (low) range or R (reverse) range, a throttle opening degree TH, a vehicle speed V, an engine revolution speed $N_E$, a turbine revolution speed $N_t$ are read at steps 508, 510, 512, and 514, respectively, from the throttle opening sensor 303, vehicle speed sensor 302, engine revolution speed sensor 301, and turbine revolution speed sensor 305, respectively. At a step 516, a revolution speed difference $N_D$ is given by subtracting $N_t$ from $N_E$. Then, a lock-up ON vehicle speed $V_{ON}$ and a lock-up OFF vehicle speed $V_{OFF}$ are determined by table look-up operation of data maps versus throttle opening degree TH and vehicle speed V. A decision is made at a judgement step 520 whether a flag LUF is set or not. The flag LUF indicates that the fluid coupling 12 locks up. If the flag LUF is not set or cleared, the program proceeds to a step 522 where a decision is made whether vehicle speed V is greater than lock-up ON vehicle speed $V_{ON}$ or not. If V is greater than $V_{ON}$, the program proceeds to a step 524 where an error e is given by subtracting a constant $N_{ml}$ from $N_D$ and then to a step 526 where a feedback control gain $G_1$ is determined by retrieval based on the error e given at the step 524. Then, the program proceeds to a step 528 where a decision is made whether the revolution speed difference $N_D$ is less than a predetermined value $N_0$ or not. If $N_D$ is greater than or equal to $N_0$, the program proceeds to a step 538 where the duty factor DUTY is given as a function of e and $G_1$. The content of the duty factor DUTY is outputted at the before-mentioned step 638 (see FIG. 6). The duty factor DUTY is increased as the function of e and $G_1$ until $N_D$ becomes less than $N_0$. When $N_D$ becomes less than $N_0$, the program proceeds from the step 258 to a step 530 where the duty factor DUTY is increased by a predetermined value α (alpha) %. After repeating this step 530 and when the duty factor DUTY becomes equal to or greater than 100%, the program proceeds from a step 532 to a step 534 where the duty factor DUTY is set equal to 100% and then the flag LUF is set at a step 536. It will now be noted that immediately after the vehicle speed V exceeds the lock-up ON vehicle speed $V_{ON}$, the duty factor DUTY is increased toward 100% at a rate determined by the step 538 or 530. Thus, the speed at which the fluid coupling 12 shifts toward the lock-up position is determined by the step 538 or 530. After the flag LUF has been set, the program proceeds from the step 520 to a step 544 where a decision is made whether the vehicle speed V is less than the lock-up OFF vehicle speed $V_{OFF}$. As long as the vehicle speed V is greater than or equal to $V_{OFF}$, the program proceeds from the step to a step 546 where the DUTY is set equal to 100%, whereas when the vehicle speed V drops and becomes less than $V_{OFF}$, the program proceeds to a step 540 where the duty factor DUTY is set equal to 0% and then to a step 542 where the lock-up flag LUF is cleared. This causes the lock-up of the fluid coupling 12 to be released. After the lock-up flag LUF has been cleared and vehicle speed V has become less than $V_{OFF}$, the program proceeds from the step 520 via the step 522 to the step 540 and then to the step 542.

Figure 5:
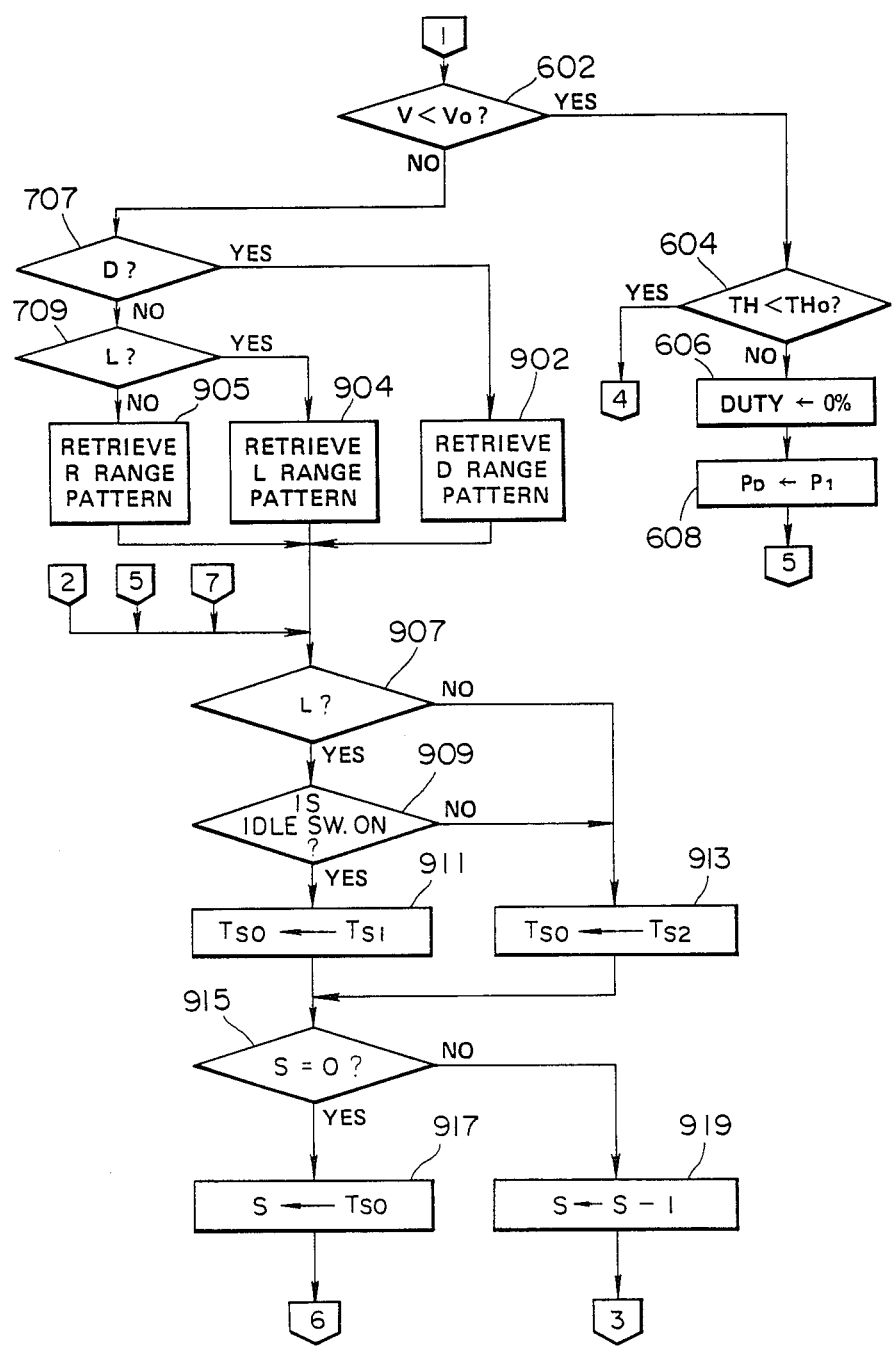
Figure 6:
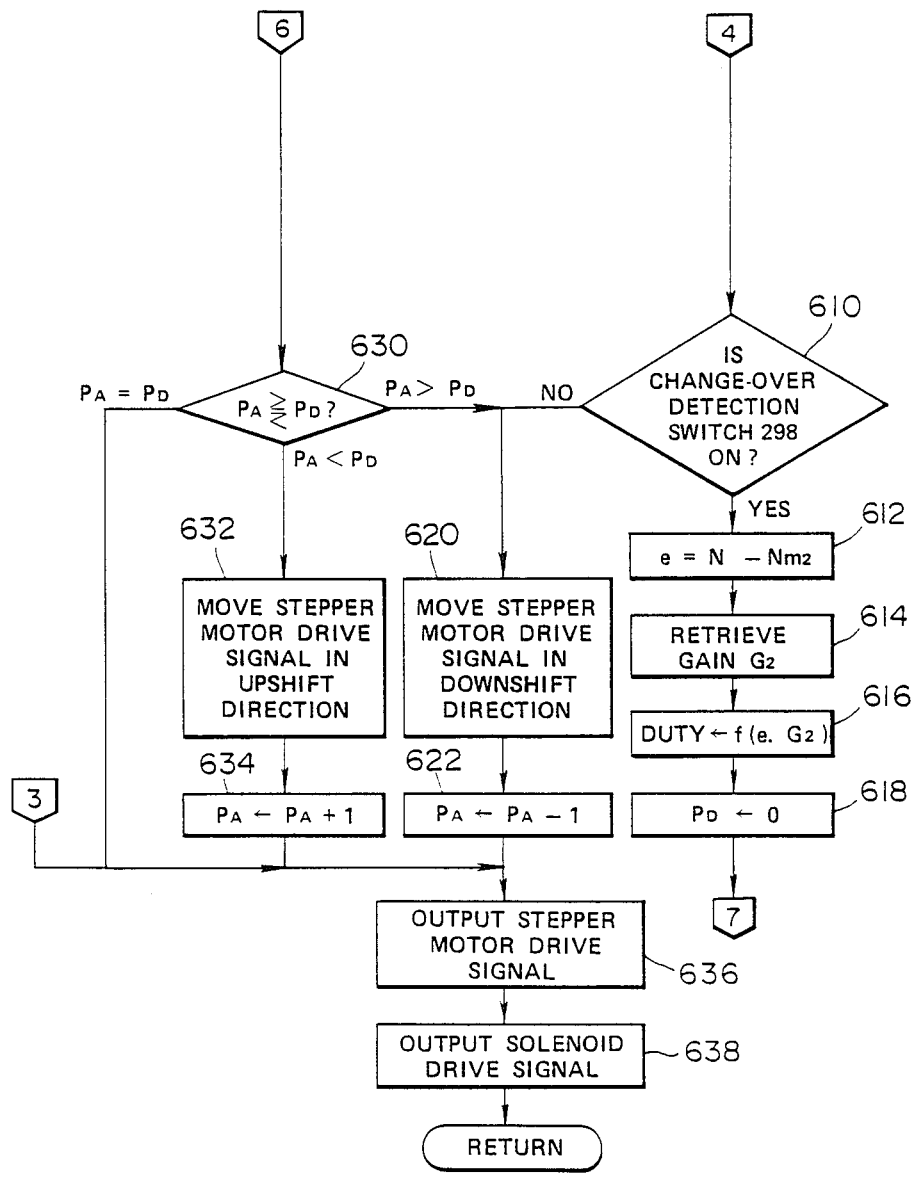

After executing step 532 or 536 or 538 or 542 or 546, the program proceeds to a step 602 shown in FIG. 5. Referring to FIG. 5, at the step 602, a decision is made whether vehicle speed V is less than a predetermined small value $V_0$. The predetermined small value $V_0$ is set equal to 2 km/h or 3 km/h and less than the lock-up ON and lock-up OFF vehicle speeds $V_{ON}$ and $V_{OFF}$. Assuming that the vehicle is at a standstill with the throttle at the idle position, the program proceeds from the step 602 to a step 604 where a decision is made whether throttle opening degree TH is less than a predetermined small value $TH_0$ or not and then to a step 610, shown in FIG. 6, where a decision is made whether the change-over detection switch 298 (see FIG. 1A) is ON or OFF. Under this condition, the rod 182 of the shift operating mechanism 112 is placed at the overstroke range position as indicated by the lower half portion thereof as illustrated in FIG. 1A and the change-over detection switch 298 is ON, and the spool of the adjustment pressure change-over valve 108 assumes a position as indicated by the lower half thereof where the drain conduit 190 is connected to the hydraulic fluid line 189 having one end connected via the choke type orifice 252 to the constant pressure regulator valve 116 and an opposite end connected to a boost port 129g of the throttle valve 114. Thus, after the step 610, the program proceeds to a step 612 where an error e is given by subtracting a predetermined constant $N_{m2}$ from the revolution speed difference $N_D$, then to a step 614 where a feedback control gain $G_2$ is determined by retrieval based on the error e determined at the step 612, and then to a step 616 where the duty factor DUTY is set as a predetermined function of the error e determined at the step 612 and the feedback control gain $G_2$. Then, the program proceeds to a step 618 where a desired or target pulse number $P_D$ is set equal to 0 (zero). Thereafter, the program proceeds via step 907, 913, 915, 917 (see FIG. 5) to a step 630 (see FIG. 6) where an actual pulse number $P_A$ is compared with the target pulse number $P_D$ which is equal to 0 under this condition. The stepper motor 110 and thus the rod 182 are moved to predetermined positions corresponding to the pulse number zero after processing along steps 620, 622, 636 and 638 or steps 632, 634, and 638. Since the electric current with the duty factor DUTY determined at the step 616 passes through the solenoid coil 224 of the solenoid valve 118, the hydraulic fluid pressure applied to the boost port 129g of the throttle valve 114 is determined by the duty factor DUTY determined as the predetermined function of the error e (determined at the step 612) and the feedback control gain $G_2$. Thus, the throttle pressure generated by the throttle valve 114 and applied to engage the forward clutch 40 or the reverse clutch 50 is determined by the duty factor DUTY given at the step 616. As a result, the amount of creeping of the vehicle is controlled.

When, under the condition where the vehicle is at a standstill, the throttle opening degree TH is increased and becomes greater than or equal to the predetermined small value $TH_0$, the program proceeds from the step 604 to a step 606, then to a step 608, and then to the step 907. Subsequently, the program proceeds through the steps 913, 915, and 917 to the step 630 (see FIG. 6). The target pulse number $P_D$ has been set equal to a predetermined pulse number $P_1$ (step 608) that is larger than 0 and the duty factor DUTY is set equal to 0% (step 606). As a result, the rod 182 is moved to the left as viewed in FIG. 1A from the position as indicated by the lower half thereof to a predetermined position corresponding to the pulse number $P_1$. When the rod 182 is placed at the position corresponding to the pulse number $P_1$, the drain conduit 190 is connected to the hydraulic fluid line 188. Thus, since the drain conduit 190 is closed by the solenoid valve 118, the constant hydraulic fluid pressure is directly applied to the righthand end of the spool 242 of the lock-up control valve 122. This causes the lock-up of the fluid coupling 12 to be released.

Referring to FIG. 5, if the vehicle speed V is greater than or equal to the predetermined value $V_0$, and the D range position is selected, the program proceeds to a step 707 and then to a step 902 where a D range shift pattern data map is retrieved to determine a target pulse number indicative of a target or desired operating position of the stepper motor 110 and the result is placed at a target pulse number $P_D$. If the L range is selected, the program proceeds via the steps 707 and 709 to a step 904 where a L range shift pattern data map is retrieved to determine a target pulse number and the result is placed at the target pulse number $P_D$. If the R range is selected, the program proceeds via the steps 707 and 709 to a step 905 where a R range shift pattern data map is retrieved to determine the target pulse number and the result is placed at the target pulse number $P_D$.

After the step 902 or 904 or 905, the program proceeds to the step 907 where a decision is made whether the L range is selected or not. If the L range is selected, the program proceeds to a step 909 where a decision is made whether the idle switch 320 is ON or OFF. The idle switch 320 is normally turned OFF, but it is turned ON when the engine throttle valve is closed to assume its idle speed position. Alternatively, a decision may be made at the step 909 whether the throttle opening degree TH is less than the small predetermined value $TH_0$ or not. If, at the step 908, it is determined that the engine throttle valve is closed to the idle speed position, i.e., it is determined that the idle switch 320 is ON, the program proceeds to a step 911 where a timer $T_{SO}$ is set equal to a predetermined timer value $T_{S1}$. If, on the other hand, it is determined at the step 907 that the L range is not selected or it is determined at the step 909 that the idle switch 320 is OFF, the program proceeds to the step 913 where the timer $T_{S0}$ is set equal to another predetermined value $T_{S2}$. The setting is such that the value $T_{S2}$ is greater than the value $T_{S1}$. Subsequently, the program proceeds to a step 915 where a decision is made whether a timer S used for driving the stepper motor 110 is set equal to zero or not. If the timer S is equal to zero, the timer S is set equal to the content of $T_{S0}$ and the program proceeds to the step 630 (see FIG. 6). If the timer S is not equal to zero, the content of the timer S is decreased by 1 (one). After the step 917, the program proceeds to the step 630 shown in FIG. 6, whereas after the step 919, the program proceeds to the step 636 shown in FIG. 6 where the actual pulse number $P_A$ is compared with the target pulse number $P_D$.

Let us now assume that the vehicle is travelling at a high vehicle speed with the continuously variable transmission establishing a relatively small reduction ratio within the D range, and the actual pulse number $P_A$ indicative of the operating position of the stepper motor 110 is equal to the target pulse number $P_D$ which contains the data obtained after retrieval of the D range shift pattern at the step 902. Under this stable operating condition, the program proceeds along the step 907, 913, 915, 917, 630, 636 and 638 when the timer S is equal to 0. In the subsequent run, since the timer S is set equal to $T_{S0}$, the program proceeds from the step 915 along the step 919, 636 and 638. The timer S is decreased by 1 during this flow of processing and thus this processing flow is taken in the subsequent runs until the timer S becomes equal to 0. Under this stable operating condition, therefore, the stepper motor 110 stays in the operating position indicated by the target pulse number $P_D$ determined at the step 902.

When, under this driving condition, the driver depresses the accelerator pedal to cause the throttle opening degree to increase to the fully opened position, a relatively small pulse number indicative of a target operating position of the stepper motor 110 that corresponds to a relatively large reduction ratio is determined by retrieval of the D range shift pattern and the result is placed at the target pulse number $P_D$. After having proceeded along the step 907, 913, 915, and 917, the program proceeds to the step 630 where the actual pulse number $P_A$ is compared with the target pulse number $P_D$. Since the actual pulse number $P_A$ is greater than the target pulse number $P_D$, the program proceeds to the step 620 where the stepper motor drive signal is moved in the downshift direction by one unit. This movement of the stepper motor drive signal in the downshift direction causes the stepper motor 110 to rotate counterclockwise as viewed in FIGS. 1A and 1B by one unit. After the step 620, the program proceeds to the step 622 where the actual pulse number $P_A$ is decreased by 1, and then proceeds to the step 636 and 638. After the timer S has been set equal to $T_{S0}$ that is equal to $T_{S2}$, since the program proceeds along the step 919, 636 and 638 bypassing the step 620, the operating position of the stepper motor 110 is unchanged during a time period indicated by the value $T_{S2}$. Thus, the speed at which the stepper motor 110 rotates is determined by the value $T_2$. The relationship is such that decreasing the value $T_{S2}$ causes the speed at which the stepper motor 110 rotates to increase. If the speed at which the stepper motor 110 rotates is excessively high, since the land 174b of the spool 174 of the shift control valve 106 moves to the right as viewed in FIGS. 1A and 1B in response to the rightward movement of the rod 182 and at an excessively high speed, a relatively large amount of hydraulic fluid is discharged from the driver pulley cylinder chamber 20 quickly to cause an excessive drop in hydraulic pressure within the driver pulley cylinder chamber 20. Since the torque applied to the driver pulley 16 is considerably large, this excessive drop in the hydraulic pressure causes a slip of the V-belt 24 relative to the driver pulley 16. The occurrence of this slip causes an excessive increase in engine revolution speed during the downshifting. Thus, in order to prevent the slip of the V-belt 24 from taking place, the speed at which the stepper motor 110 rotates is set at a relatively low speed value. The value $T_{S2}$ is therefore set at the relatively large value so that the stepper motor 110 rotates at the above-mentioned relatively low speed value.

Under the operating condition where the vehicle is travelling at a relatively high speed with the continuously variable transmission establishing a relatively small reduction ratio with the D range, if the driver releases the accelerator pedal and shifts the manual valve 104 to the L range position, the program proceeds along the step 709 to the step 904 where a relatively small target pulse number indicative of a relatively large reduction ratio is determined after the retrieval of the L range shift pattern and the result is placed at the target pulse number $P_D$. After the step 902, the program proceeds along step 907, 909, 911, 915, 917, 630, 620, 622, 636, and 638. In the subsequent run, the program proceeds along the step 915, 919, 636, and 638. Since, during this downshifting, the stepper motor 110 rotates by one unit upon expiration of a predetermined time period determined by the value $T_{S1}$ that is less than the value $T_{S2}$, the stepper motor 110 is rotated at a relatively high speed. Since the torque applied to the driver pulley 16 is small during this downshifting, even if there occurs the above-mentioned drop in the hydraulic fluid pressure within the driver pulley cylinder chamber 20, the V-belt 24 will not slip relative to the driver pulley 16. Since the speed at which the stepper motor 110 rotates is increased, a quick downshifting to the reduction ratio for effective engine brake running of the vehicle has been accomplished. With the quick downshifting, the time required from the moment when the driver shifts the manual valve 104 from the D range position to the L range position to the moment when the drivers feels an effective engine brake running has been shortened, thus providing a drive feeling complying with the expectation by the driver. In this embodiment previously described, the L range position is set as a drive range which the driver may select when he/she wishes an engine brake running of the vehicle.

What is claimed is:

1. A control for continuously variable transmission for an automotive vehicle having an engine drivingly connected to the continuously variable transmission, the continuously variable transmission including a manually operable member movable among a plurality of range positions including a predetermined drive range position provided for effective engine brake running of the automotive vehicle, the control comprising:
    a shift actuator;
    means for effecting a shifting in reduction ratio of the continuously variable transmission in response to a change in operating position of said shift actuator,
    means for detecting which of the range positions the manually operable member is placed at and generating an output signal indicative of the range position detected;
    means for detecting a throttle opening degree of the engine throttle valve and generating an output signal indicative of the throttle opening degree detected; and
    means responsive to said output signals for increasing a speed at which said shift actuator changes its operating position when the manually operable member is placed at the predetermined drive range position and the engine throttle valve is fully closed.

2. A control as claimed in claim 1 wherein said means responsive to said output signals causes said shift actuator to change its position at a first speed when said manually operable member is in a first range and said throttle valve is in a first position and to change its position at a second speed when said manually operable member is in a second range and said throttle valve is in said first position.

3. A control as claimed in claim 1 wherein said means responsive to said output signals causes said shift actuator to change its position at a first speed when said manually operable member is in a first range and said throttle valve is in a first position and to change its position at a second speed when said manually operable member is in said first position and said throttle valve is in a second position.

4. A control for a continuously variable transmission for an automotive vehicle having an engine drivingly connected to the continuously variable transmission, the continuously variable transmission including a manually operable member movable among a plurality of range positions including a predetermined drive range position provided for effective engine brake running of the automotive vehicle, the control comprising:
 a shift actuator;
 means for effecting a shifting in reduction ratio of the continuously variable transmission in response to a change in operating position of said shift actuator;
 means for detecting which of the range positions the manually operable member is placed at and generating an output signal indicative of the range position detected;
 means for detecting a throttle opening degree of the engine throttle valve and generating an output signal indicative of the throttle opening degree detected; and
 means responsive to said output signals for varying a speed at which said shift actuator changes its operating position;
wherein said means responsive to said output signals causes said shift actuator to change its position at a first speed when said manually operable member is in a first range and said throttle valve is in a first position and to change its position at a second speed when said manually operable member is in a second range and said throttle valve is in said first position.

5. A control for a continuously variable transmission for an automotive vehicle having an engine drivingly connected to the continuously variable transmission, the continuously variable transmission including a manually operable member movable among a plurality of range positions including a predetermined drive range position provided for effective engine brake running of the automotive vehicle, the control comprising:
 a shift actuator;
 means for effecting a shifting in reduction ratio of the continuously variable transmission in response to a change in operating position of said shift actuator;
 means for detecting which of the range positions the manually operable member is placed at and generating an output signal indicative of the range position detected;
 means for detecting a throttle opening degree of the engine throttle valve and generating an output signal indicative of the throttle opening degree detected; and
 means responsive to said output signals for varying a speed at which said shift actuator changes its operating position;
wherein said means responsive to said output signals causes said shift actuator to change its position at a first speed when said manually operable member is in a first range and said throttle valve is in a first position and to change its position at a second speed when said manually operable member is in said first position and said throttle valve is in a second position.

6. A control for a continuously variable transmission for an automotive vehicle having an engine drivingly connected to the continuously variable transmission, the engine having a throttle valve movable to an idle speed position, the control comprising:
 a manually operable member movable to a plurality of range positions including a predetermined drive range position provided for effective engine brake running of the automotive vehicle;
 a shift actuator movable between a plurality of operating positions;
 means for effecting a shifting in reduction ratio of the continuously variable transmission in response to a change in operating position of said actuator;
 means for detecting which of said plurality of range positions said manually operable member has moved to and generating a predetermined drive range position indicative signal when said manually movable member has moved to said predetermined drive range position;
 means for detecting whether or not the throttle valve has moved to the idle speed position and generating an idle speed position indicative signal when the throttle valve has moved to the idle speed position; and
 means responsive to said predetermined drive range position indicative signal and said idle speed position indicative signal for allowing said shift actuator to move at a first predetermined speed when said idle speed position is absent regardless whether or not said predetermined drive range position indicative signal is present, but allowing said shift actuator to move at a second predetermined speed when both said idle speed position indicative signal and said predetermined drive range position indicative signal are present, said second predetermined speed being higher than said first predetermined speed.

7. A control as claimed in claim 6, wherein said shift actuator includes a stepper motor.

8. A control for a continuously variable transmission for an automotive vehicle having an engine drivingly connected to the continuously variable transmission, the engine having a throttle valve movable to an idle speed position, the control comprising:
 a manually operable member movable among a plurality of range positions including a predetermined drive range position provided for effective engine brake running of the automotive vehicle;
 a shift actuator movable between a plurality of operating positions;
 means for effecting a shifting in reduction ratio of the continuously variable transmission in response to a change in operating position of said shift actuator;
 means for detecting which of said plurality of range positions said manually operable member has moved to and generating a predetermined drive range position indicative signal when said manually movable member has moved to said predetermined drive range position;
 means for detecting whether or not the throttle valve has moved to the idle speed position and generating an idle speed position indicative signal when the throttle valve has moved to the idle speed position; and
 means responsive to said predetermined drive range position indicative signal and said idle speed position indicative signal for allowing said shift actuator to move at an increased speed when said manually operable member has moved to said predetermined drive range position and the engine throttle valve has moved to the idle speed position.

* * * * *